(12) United States Patent
Wijmans et al.

(10) Patent No.: US 6,789,288 B2
(45) Date of Patent: Sep. 14, 2004

(54) NATURAL GAS DEHYDRATION PROCESS AND APPARATUS

(75) Inventors: Johannes G. Wijmans, Menlo Park, CA (US); Alvin Ng, Palo Alto, CA (US); Anurag P. Mairal, Fremont, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 47 days.

(21) Appl. No.: 10/280,147

(22) Filed: Oct. 25, 2002

(65) Prior Publication Data

US 2004/0079228 A1 Apr. 29, 2004

(51) Int. Cl.[7] ............................................. B01D 53/14
(52) U.S. Cl. .......................... 15/188; 95/46; 95/206; 95/231
(58) Field of Search ................ 95/45, 46, 52, 95/156, 188, 206, 231; 96/234, 240, 4, 6

(56) References Cited

U.S. PATENT DOCUMENTS

| | | | | |
|---|---|---|---|---|
| 3,651,617 A | * | 3/1972 | Hodgson | 95/188 |
| 3,720,717 A | | 3/1973 | Cox et al. | 260/593 |
| 4,405,409 A | | 9/1983 | Tusel et al. | 202/200 |
| 4,755,299 A | | 7/1988 | Bruschke | 210/640 |
| 4,772,295 A | * | 9/1988 | Kato et al. | 95/50 |
| 4,802,988 A | | 2/1989 | Bartels et al. | 210/640 |
| 4,857,078 A | * | 8/1989 | Watler | 95/50 |
| 5,141,536 A | | 8/1992 | Schievelbein et al. | 55/208 |
| 5,182,022 A | | 1/1993 | Pasternak et al. | 210/638 |
| 5,209,762 A | | 5/1993 | Lowell | 55/31 |
| 5,234,552 A | | 8/1993 | McGrew et al. | 203/18 |
| 5,350,519 A | | 9/1994 | Kaschemekat et al. | 210/640 |
| 5,415,681 A | * | 5/1995 | Baker | 95/45 |
| 5,453,114 A | | 9/1995 | Ebeling | 95/166 |
| 5,490,873 A | | 2/1996 | Behrens et al. | 95/160 |
| 5,552,023 A | | 9/1996 | Zhou | 203/18 |
| 5,554,286 A | | 9/1996 | Okamoto et al. | 210/500 |
| 5,643,421 A | | 7/1997 | Smith | 203/12 |
| 5,681,433 A | * | 10/1997 | Friesen et al. | 203/39 |
| 5,725,636 A | | 3/1998 | Gavlin et al. | 95/231 |
| 5,766,423 A | | 6/1998 | Smith | 203/12 |
| 5,772,734 A | * | 6/1998 | Baker et al. | 95/42 |
| 5,788,745 A | | 8/1998 | Hahn | 95/231 |
| 5,964,923 A | * | 10/1999 | Lokhandwala | 95/50 |
| 6,159,542 A | | 12/2000 | Kondo et al. | 427/245 |
| 6,306,197 B1 | * | 10/2001 | Boyce et al. | 95/9 |
| 6,387,269 B1 | | 5/2002 | Eltner et al. | 210/640 |
| 6,666,906 B2 | * | 12/2003 | Hallman | 95/52 |
| 2003/0233934 A1 | * | 12/2003 | Wijmans et al. | 95/46 |

OTHER PUBLICATIONS

J. Caro et al., "Zeolite membranes—state of their development and perspective," Microporous and Mesoporous Materials, 38, p. 3–24 (2000).

* cited by examiner

Primary Examiner—Duane S. Smith
(74) Attorney, Agent, or Firm—J. Farrant

(57) ABSTRACT

A process and corresponding apparatus for dehydrating gas, especially natural gas. The process includes an absorption step and a membrane pervaporation step to regenerate the liquid sorbent.

38 Claims, 9 Drawing Sheets

NATURAL GAS DEHYDRATION PROCESS AND APPARATUS

This invention was made in part with Government support under SBIR award number DE-FG03-01ER83272, awarded by the Department of Energy. The Government has certain rights in this invention.

FIELD OF THE INVENTION

The invention is a process and apparatus for dehydrating gas, such as natural gas. The process uses an absorption system to dehydrate the gas, and a membrane pervaporation unit to regenerate the water-laden desiccant.

BACKGROUND OF THE INVENTION

Natural gas as obtained from the well contains water vapor. Before the gas can be passed to the pipeline, it must be dried to prevent problems such as hydrate or ice formation or corrosion.

Glycol dehydration, which is simple and inexpensive, is currently the most widely used method of dehydrating natural gas. The estimated number of glycol dehydration systems operating in the United States alone is at least 55,000.

In a typical dehydrator, wet gas is scrubbed with dry glycol to yield a product gas of lowered water dew point. The glycol absorbs not only water, but also aromatic compounds, such as BTEX, and other hydrocarbon vapors.

The water-rich or "spent" glycol is passed to a regeneration system, which typically includes a flash tank, where methane and other light gases are flashed off, a reboiler and a regeneration still column. The water-laden glycol is heated to drive off absorbed water, and dry glycol is recovered for reuse in the absorber. Unfortunately, this heating also vaporizes hydrocarbons that have been sorbed into the glycol, and these are expelled, along with the water vapor, in the hot overhead vent stream from the still column.

Although the major component is steam, this overhead vent stream may contain as much as 20 mol % or more of organic compounds, including aromatic and non-aromatic organic vapors. Of these organic compounds, a significant proportion may be the aromatic compounds benzene, toluene, ethylbenzene and xylene, together commonly known as BTEX compounds. These organic emissions are now classified as Hazardous Air Pollutants (HAPs), and are subject to emissions regulations both in the United States and internationally.

There is, therefore, a need for a simple, reliable and cost-effective method to reduce or eliminate the release of these organic components.

So-called "enhanced" regeneration systems have been used to increase water removal from the spent glycol, and some of these systems can reduce HAP emissions. For example, U.S. Pat. No. 5,141,536, to Texaco, describes an apparatus with a condenser unit in the reboiler overhead vent to condense hydrocarbon components and some water, thus venting a hydrocarbon-depleted water vapor stream. U.S. Pat. No. 5,234,552 describes a condensation system to recover liquid hydrocarbons and collect remaining hydrocarbon vapors for use as fuel for the glycol reboiler. U.S. Pat. No. 5,788,745, to Phillips Petroleum, describes the use of both a condenser and a phase separator to recover liquid hydrocarbons.

Another technique for glycol regeneration is stripping against a gas or steam. A typical configuration for a stripper is a packed or multi-tray tower, with the stripping gas normally flowing upward countercurrent to the descending liquid glycol. Depending on the stripping agent used, water, hydrocarbons, or both are absorbed from the glycol into the stripping gas, thus regenerating the glycol for reuse in dehydrating the natural gas.

U.S. Pat. No. 5,643,421, to OPC Engineering, describes a glycol regeneration process comprising flash evaporation to recover hydrocarbon components from the spent glycol, followed by heating and multiple stripping steps using a vaporized solvent as the stripping agent to dehydrate the glycol. U.S. Pat. No. 5,766,423, also to OPC Engineering, uses basically the same process, but includes condensation of a portion of the once-stripped glycol stream for additional removal of hydrocarbons.

U.S. Pat. No. 5,490,873, to Bryan Research and Engineering, combines condensation of the reboiler overhead with further treatment of the lean glycol stream by stripping against a sidestream of the dehydrated natural gas. U.S. Pat. No. 5,453,114, to Ebeling, uses a stripping step to remove hydrocarbons upstream of the glycol reboiler. U.S. Pat. No. 5,209,762, to Gas Research Institute, uses an integrated combination of condensation and steam stripping to produce dischargeable water, organic liquid and an organic vent gas that may be useful as fuel.

U.S. Pat. No. 5,725,636, also to Gas Research Institute, adds potassium salts to the glycol to increase water absorption and decrease hydrocarbon absorption in the natural gas dehydration step. Since hydrocarbons are less readily absorbed, the glycol has greater water-absorbing capacity. The regeneration process also produces a leaner glycol stream and the water vapor vented to the atmosphere has a lower hydrocarbon content.

These and other processes can achieve low water concentrations in the glycol, which in turn provides good dehydration of the raw gas, resulting in low dew points in the treated gas. They can also reduce, but do not eliminate, BTEX and other HAP air emissions through the additional treatment step. However, most of these processes produce an additional gaseous or aqueous waste stream that requires on-site or off-site attention such as incineration, disposal, or further treatment.

Despite these efforts, a cost-effective regeneration technology that truly minimizes or eliminates HAP emissions has not been developed. There yet remains a need for such a process.

Membranes have for many years been known to be usable in pervaporation mode for dehydrating organic liquids. For example, many patents to GFT and others, such as U.S. Pat. Nos. 3,720,717, 4,405,409 and 4,755,299, describe such separations using polyvinyl alcohol (PVA) membranes.

A large number of patents to Texaco also disclose pervaporation processes using membranes of various types for dehydrating organic liquids, such as organic acids. In particular, U.S. Pat. No. 4,802,988 describes PVA membranes and processes for treating ethylene glycol/water solutions to reduce the ethylene glycol content in the permeate to low levels, and U.S. Pat. No. 5,182,022 describes a similar process using ion-exchange type sulfonated polyethylene membranes to produce a low-glycol permeate.

U.S. Pat. No. 5,552,023, to Allied Signal, describes a process to treat spent deicing fluid (ethylene glycol mixture) using a combination of membrane distillation through a porous polytetrafluoroethylene membrane and reverse osmosis. U.S. Pat. No. 5,554,286, to Mitsui Engineering, describes an A-zeolite-type membrane for pervaporation applications, and includes sample data for dehydration of alcohols.

U.S. Pat. No. 5,350,519, to Membrane Technology and Research, describes a process including a condenser to condense the glycol reboiler overhead vent stream and recover liquid hydrocarbon components, followed by a pervaporation step of the waste aqueous stream to recover additional hydrocarbon components and vent a hydrocarbon-depleted water stream.

SUMMARY OF THE INVENTION

The invention is a process and apparatus for dehydrating gas, especially, but not necessarily, natural gas. The process uses absorption into a liquid desiccant to dehydrate the gas, and pervaporation to regenerate the water-laden desiccant. The pervaporation step can both regenerate the desiccant and capture any hazardous organic components that may be present in a single step.

In a basic embodiment, the process of the invention includes the following steps:
(a) subjecting a gas stream containing water to an absorption step, comprising the steps of:
  (i) contacting the gas stream with a liquid desiccant in an absorber;
  (ii) withdrawing from the absorber a dehydrated gas stream;
  (iii) withdrawing from the absorber a spent desiccant stream comprising desiccant and water; and
(b) subjecting the spent desiccant to a regeneration step, comprising:
  (i) providing a membrane unit containing a membrane having a feed side and a permeate side and exhibiting a pervaporation separation factor in favor of water over the desiccant;
  (ii) passing the spent desiccant into the membrane unit and across the feed side under pervaporation conditions;
  (iii) providing a driving force for transmembrane permeation;
  (iv) withdrawing from the feed side a residue desiccant stream depleted in water compared with the spent desiccant stream;
  (v) withdrawing from the permeate side a permeate stream comprising water vapor.

The most common desiccants are glycols, particularly ethylene glycols.

The absorption step may be performed in any convenient manner that brings gas and desiccant into good partitioning contact. Typically, but not necessarily, it is carried out in an absorption column or tower by flowing the gas stream to be dried upward in counter-current contact with the down-flowing liquid desiccant. In this case, the drier gas stream is withdrawn from the top of the column and the water-laden liquid sorbent is withdrawn from the bottom. As just one alternative to the traditional tower, a membrane contactor can be used for the absorption step.

The reduction in water dew point of the gas achieved in the absorption step depends on the sorbent and the operating conditions. Dew point reductions of at least about 40° C. or more can normally be accomplished, and much greater reductions, such as 70° C. or more, are possible in many cases.

The membrane separation step is carried out in pervaporation mode. That is, the membrane feed stream is in the liquid phase, the permeate is in the gas phase, and the driving force is provided by maintaining a permeate partial pressure lower than the feed saturation vapor pressure for permeating components.

This partial pressure difference may be provided in any convenient manner, such as by one or more of heating the feed, cooling the permeate, drawing a partial vacuum on the permeate side, and providing a gas sweep on the permeate side. It is preferred either simply to heat the feed liquid, thus raising the water vapor pressure on the feed side of the membrane, or to both heat the feed and use a sweep gas on the permeate side.

The membrane separation unit may contain any type of membrane capable of selectively passing water and rejecting the desiccant when operated in pervaporation mode. For example, polymeric membranes or inorganic membranes may be used. A most preferred membrane is a composite membrane having a ceramic support coated with a selective layer of a zeolite or silica.

The water concentration in the desiccant stream that forms the membrane feed may be any value. However, the water content will normally be substantially less than 50 wt %, and usually will be no more than about 20 wt %, and typically might be between about 5 wt % and 10 wt %.

The water concentration in the membrane residue stream should preferably be sufficiently low that the desiccant can be reused in the absorption step without additional water removal treatment. Depending on the application, this usually means that the water content of the residue stream should be below 5 wt %, and typically much lower, for example below 2 wt %, 1 wt %, 0.5 wt % or less.

The process is particularly useful for treating natural gas using glycol as the desiccant. In a typical glycol absorption process, lean glycol is contacted with natural gas in a counter-current column. The glycol absorbs water from the wet gas. Organic compounds that are also present in the gas, such as aliphatic hydrocarbons, and especially BTEX and other aromatic hydrocarbons, are soluble in the glycol sorbent and are extracted with the water.

The spent glycol, laden with water and containing the sorbed organic components, is heated and sent to the membrane separation unit, where it is passed across the surface of a membrane with a high separation factor in favor of water over organic compounds such as glycol and BTEX hydrocarbons. The vapor permeating the membrane is sufficiently free of such organic components to meet requirements for discharge to the environment.

The residue stream, containing lean glycol, the BTEX aromatics and any other hydrocarbon components, may be recirculated to the absorption column.

Thus, in this typical, preferred embodiment relating to natural gas, the process of the invention includes the following steps:
(a) subjecting a natural gas stream to an absorption step, comprising the steps of:
  (i) contacting the natural gas stream with glycol in an absorber;
  (ii) withdrawing from the absorber a dehydrated natural gas stream;
  (iii) withdrawing from the absorber a water-laden glycol stream; and
(b) subjecting the water-laden glycol stream to a regeneration step, comprising:
  (i) providing a membrane unit containing a membrane having a feed side and a permeate side and exhibiting a first pervaporation separation factor in favor of water over glycol and a second pervaporation separation factor in favor of water over benzene;
  (ii) heating the water-laden glycol stream;
  (iii) passing the heated water-laden glycol stream into the membrane unit and across the feed side under pervaporation conditions;

(iv) withdrawing from the feed side a regenerated glycol stream;

(v) withdrawing from the permeate side a permeate stream comprising water vapor;

(vi) recirculating at least a portion of the regenerated glycol stream to the absorption step.

In this case, the spent glycol that forms the membrane feed stream is typically heated to a temperature between about 150° C. and 250° C., and the preferred membrane type is an inorganic membrane, such as a silica membrane, that can operate without difficulty at high temperatures.

By operating at such a feed temperature, and optionally passing a sweep gas, such as air, to lower the partial pressure of water vapor on the permeate side, it is possible to reduce the water content of the regenerated glycol to a low level, such as 1 wt %, 0.5 wt %, 0.2 wt % or even less. Thus, the glycol that is returned to the absorption column is drier than is the case when glycol is regenerated in a conventional reboiler, which typically reduces the water content to no lower than about 2 wt %.

The use of drier glycol in the absorption step means that the dew point of the treated natural gas can be reduced compared with conventional dehydration. The dehydrated gas may have a water dew point as low as −20° C., −30° C. or lower, for example.

Expressed as a reduction in dew point, the process of the invention is able to achieve reductions of water vapor dew point of as much as 50° C., 60° C., 70° C., 80° C. or even more.

The membranes provide high separation factors in favor of water over all organic components. Thus, the BTEX concentration in the water vapor permeate stream is generally well below 1,000 ppmv, and typically no more than about 100 ppmv, and the glycol content is negligibly small, such as less than 50 ppmv. These low levels enable dehydrators to operate so as to meet various requirements and regulations in many regions for HAPs emissions. Thus, in general, the permeate stream may be safely discharged to the atmosphere.

In a final aspect, the invention is apparatus for carrying out a dehydration process, and comprising the following elements:

(a) an absorber, having a wet gas inlet, a dehydrated gas outlet, a liquid desiccant inlet and a spent liquid desiccant outlet, and being adapted to bring wet gas into water-partitioning contact with the liquid desiccant;

(b) a membrane separation unit, having a feed inlet, a feed outlet, and a permeate outlet, and containing an inorganic membrane having a feed side and a permeate side, and characterized by the ability to provide pervaporation separation factors of at least about 100 in favor of water over desiccant and in favor of water over benzene when used to treat a liquid desiccant stream containing about 5 wt % water and 1 wt % benzene at 200° C.;

(c) first connection means connecting the membrane separation unit feed inlet and the absorber spent liquid desiccant outlet, so that spent liquid desiccant may pass out of the absorber and into the membrane separation unit;

(d) second connection means connecting the membrane separation unit feed outlet and the liquid desiccant inlet, so that regenerated liquid desiccant may pass out of the membrane separation unit and into the absorber;

(e) heating means positioned between the absorber and the membrane separation unit to enable spent liquid desiccant to be heated before entering the membrane separation unit.

DETAILED DESCRIPTION OF THE INVENTION

The term gas as used herein means a gas or a vapor.

The terms organic vapor and organic compound as used herein include, but are not limited to, saturated and unsaturated compounds of hydrogen and carbon atoms in straight chain, branched chain and cyclic configurations, including aromatic configurations, as well as compounds containing oxygen, nitrogen, halogen or other atoms.

The term BTEX as used herein means one or more of benzene, toluene, ethylbenzene and xylenes.

The terms desiccant and sorbent are used interchangeably herein, and refer to agents, usually organic agents, capable of dehydrating gas.

The invention is a process and apparatus for dehydrating gas. The process uses absorption into a liquid desiccant to dehydrate the gas, and pervaporation to regenerate the water-laden desiccant.

The process may be used to treat any gas stream that may be dehydrated by contact with a desiccant in liquid form.

Figure 1:
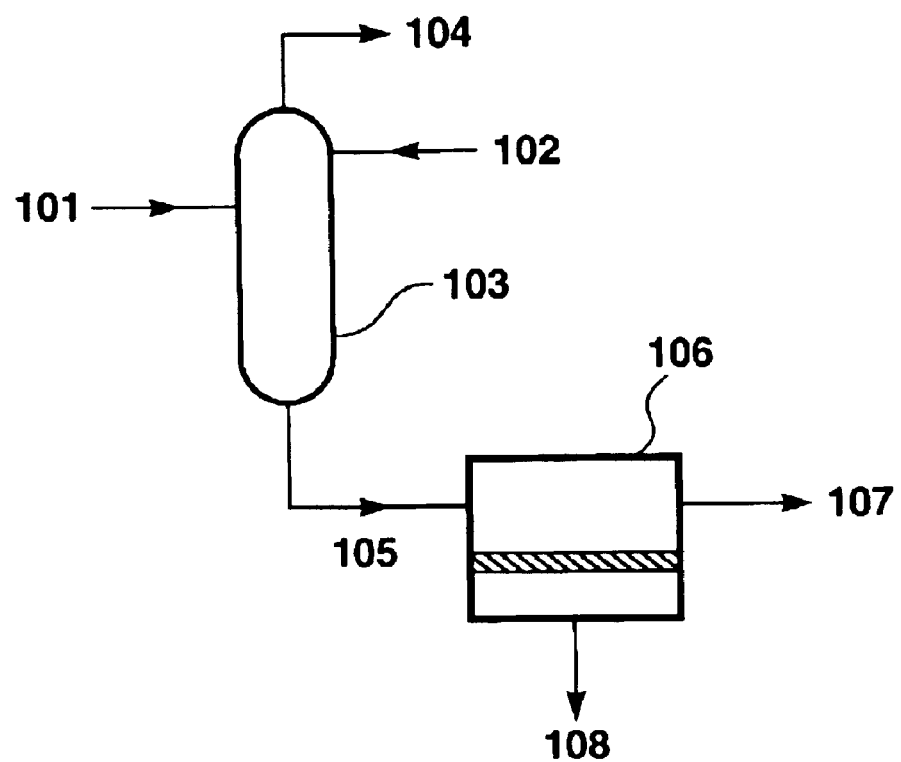
FIG. 1 is a schematic representation of a basic embodiment of the process of the invention.

In basic form, the invention includes two unit operations—the dehydration step itself and a membrane separation step for regenerating the desiccant. The invention in this form is illustrated in FIG. 1. It will be appreciated by those of skill in the art that this and the other figures described below are very simple schematic diagrams, intended to make clear the key aspects of the invention, and that an actual process train will usually include many additional components of a standard type, such as compressors, heaters, chillers, condensers, pumps, blowers, other types of separation and/or fractionation equipment, valves, switches, controllers, pressure-, temperature-, level-, and flow-measuring devices and the like. The considerations and criteria discussed below for FIG. 1 also apply to FIG. 2.

Turning now to FIG. 1, wet gas stream 101 enters absorber 103. The absorber is typically a large tank, tower or column, usually equipped with perforated plates or baffles. Gas stream 101 generally enters at the bottom of the absorber and flows upwards toward the top. A liquid desiccant stream, 102, is passed into the absorber, usually at the top. Any suitable desiccant, for example glycol, may be used within the scope of the invention.

The desiccant trickles downward over the baffles in countercurrent exchange with the up-flowing gas. The desiccant is chosen for its ability to sorb water preferentially over the desired gas components of the gas stream, so that water partitions preferentially into the desiccant. It is acceptable, if they are also present as impurities in the gas stream, for organic compounds, for example aliphatic and aromatic hydrocarbons, to partition into the desiccant. Thus, a feature of the process is that it is not necessary to use a desiccant that is selective only for water vapor.

The dry gas stream exits the absorber as stream 104, and may be passed to any destination. The amount of water vapor remaining in the dried gas depends on the operating conditions of the absorber and the initial water content of the desiccant. If the water content of the desiccant is at a low level, such as 1 wt %, 0.5 wt %, 0.2 wt %, or even less, as can be achieved by the pervaporation step, the absorption step will be able to produce a dried gas stream that has a lower dew point than can be achieved by conventional dehydration. The reduction in dew point that can be achieved by the process of the invention may be as much as 50° C., 60° C., 70° C., 80° C. or even more.

The water-laden or "spent" desiccant solution, stream 105, is withdrawn from the bottom of the absorber.

FIG. 1 and the above description describe the absorption step as it is carried out using the traditional absorption tank or column. As mentioned in the Summary section, however, the absorption step can be carried out in any convenient manner, and the scope of the invention is not limited to any particular absorption means. As a non-limiting example, a membrane contactor can be used. Such a contactor uses porous membranes to provide a large surface area interface between gas and sorbent liquid. Gas flows across the membrane surface on the feed side, and is withdrawn as a dehydrated residue stream, corresponding to stream 104 in FIG. 1. Sorbent flows on the permeate side of the membrane and is withdrawn thence as a water-laden desiccant stream, corresponding to stream 105. The membranes may be in the form of tubes, flat sheets, or fibers, and may be mounted in any appropriate fashion.

Stream 105 is passed to membrane pervaporation step 106. Pervaporation is a low-pressure membrane process that can be used to separate components of differing volatilities from solutions. The overall separation factor achieved is equal to the product of the separation achieved by evaporation of the liquid and the separation achieved by selective permeation through the membrane. The membranes for use in the process of the invention may be of any kind that results in adequate separation factors in favor of water over desiccant and in favor of water over the volatile organic component, if such is present. By adequate separation factors, we mean separation factors of preferably at least about 100. The membranes also exhibit transmembrane vapor pressure-normalized water fluxes of, preferably, at least about 10 g/m$^2$·h·psid, more preferably at least about 15 g/m$^2$·h·psid, and most preferably at least about 20 g/m$^2$·h·psid.

For use as dehydration membranes, a number of suitable materials are known. Polyvinyl alcohol (PVA) is the most commonly used commercial material. Another polymer that has sometimes been used is cellulose acetate. Yet other dehydration membranes include chitosan membranes and ion-exchange membranes, such as NAFION® (polyperfluorosulfonic acid) membranes.

Inorganic membranes comprising hydrophilic materials may also be used as dehydration membranes. Such membranes include amorphous silica membranes and membranes including a water permeating zeolite layer, such as ZSM-5. Zeolite membranes are described, for example, in J. Caro et al., "Zeolite membranes—state of their development and perspective", *Microporous and Mesoporous Materials*, Vol. 38, 3–24, 2000, and in a number of patents, such as U.S. Pat. Nos. 5,554,286; 6,159,542 and 6,387,269 to Mitsui Engineering.

Such membranes have been developed commercially, and can be purchased from Mitsui and Company (USA) of New York; Isotronics of Paradise Valley, Ariz.; Sulzer Chemtech Membrane Systems, based in Heinitz, Germany; and Pervatech BV of Enter, The Netherlands.

The membranes may be homogeneous, asymmetric, or composite membranes, or any other structure known in the art, and may be formed as flat sheets, hollow fibers, tubes or any other convenient form.

The pervaporation unit can include a single membrane module or a bank or array of multiple membrane modules. A single bank of membrane modules is usually adequate to meet the processing requirements for many applications. If additional processing is desirable, an array of modules in a multistep or multistage configuration with recycle of intermediate streams, as is known in the art, may be used.

Transport through the membrane is induced by maintaining the vapor pressure on the permeate side of the membrane lower than the vapor pressure of the feed liquid. On the feed side of the membrane, the partial vapor pressure of any component will be the partial pressure of the vapor in equilibrium with the feed solution. Changing the hydrostatic pressure of the feed solution thus has a rather small and usually negligible effect on transmembrane flux or selectivity.

However, the vapor pressure on the feed side is a function of the temperature of the feed solution. Heating stream 105 before passing it into pervaporation step 106 will, therefore, increase the driving force, and is preferred, as is discussed in more detail with respect to FIG. 2, below.

The permeate pressure also has a major effect on transmembrane flux. The vapor pressure of a component on the permeate side can be reduced in several ways, for example, by drawing a vacuum on the permeate side of the membrane, by sweeping the permeate side to continuously remove permeating vapor, or by cooling the permeate vapor stream to induce condensation. These options are discussed in more detail in reference to FIG. 2.

Water-vapor-enriched permeate stream 108 is withdrawn from the permeate side of the membrane. Because the membranes are relatively very impermeable to the desiccant and many other aliphatic and aromatic organic components, the organic content of stream 108 is typically low, such as in the low hundreds of ppmv level or below. This stream may be discharged as vapor to the atmosphere, condensed and discharged as liquid, or sent to any other chosen destination.

The other stream exiting the pervaporation step is membrane residue stream 107, which is the water-depleted liquid desiccant stream, typically containing less than about 1 wt % water. The low permeability of the membranes to the desiccant and other volatile organic compounds means that these components are retained almost completely in the residue stream. Stream 107 may be sent to any destination, although, in many cases, it can be recirculated, in whole or part, for further use in the absorption step without the need for additional water removal treatment.

A particularly useful application is in natural gas dehydration, using glycol as desiccant. In the interests of clarity and simplicity, therefore, our process is described hereafter principally as it relates to using a glycol desiccant to dehydrate natural gas. However, this is not intended to limit the scope of the process. Those of skill in the art will readily appreciate how to apply the process of the invention using other sorbents and treating other types of gas streams by following the exemplary teachings specific to natural gas treatment that are given herein.

Figure 2:
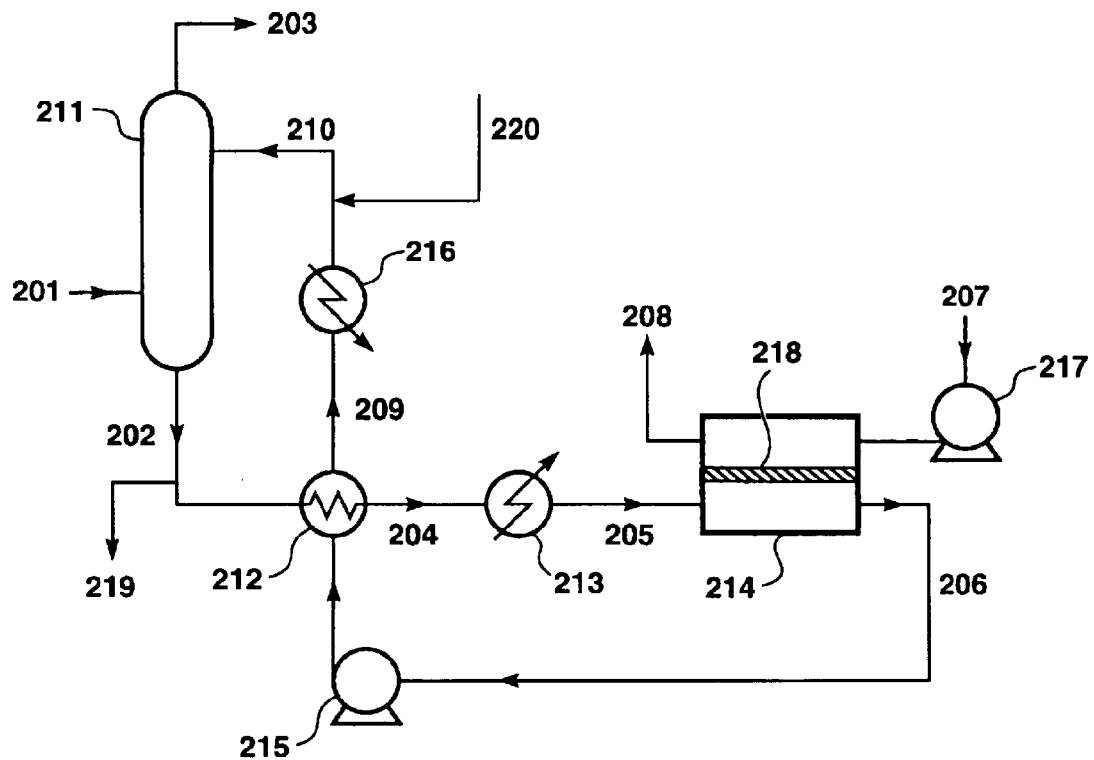
FIG. 2 is a schematic representation of a preferred embodiment of the process of the invention, including heat integration and a permeate sweep.

Turning now to FIG. 2, this shows a preferred embodiment of the invention as it can be applied to natural gas dehydration, and including heat integration and reuse of the desiccant. In this case, wet natural gas stream 201 enters glycol absorber 211. Glycol absorbers are used nearly universally throughout gas production fields and are so well-known in the art as to need no lengthy description. Natural gas arriving from one or many wells enters the bottom of the absorber and flows upwards to the top. The wet gas is usually introduced at the production pressure, typically between about 50 psia and 2,000 psia, although the pressure may be reduced or increased if desired. Likewise, the gas may be fed in at production temperature, or the temperature may be adjusted if needed, such as by an air cooler, to bring the gas to the desired temperature. Typically, a gas temperature below about 50° C. is preferred.

As mentioned above, the absorber is a large tank, tower or column equipped with perforated plates or baffles. A liquid glycol desiccant stream, 210, is passed into the top of the absorber. The glycol used should be reasonably stable against heat and chemical decomposition, and should have a relatively low vapor pressure. A commonly used glycol is triethylene glycol (TEG), which is cheap, thermally stable up to about 200–250° C. or above, and has good water sorption capability. Other glycols, for example monoethylene glycol (MEG), diethylene glycol (DEG) and tetraethylene glycol (T4EG), are also used. To facilitate partitioning, the glycol sorbent is typically introduced at a temperature a few degrees, such as about 5° C., warmer than the incoming gas.

The desiccant trickles downward over the baffles in countercurrent exchange with the up-flowing gas. Under these conditions, water partitions preferentially into the more polar glycol. Typically the gas also contains aliphatic and aromatic volatile organic compounds, such as BTEX compounds, in amounts of a few hundred ppmv. These compounds, and particularly aromatic BTEX compounds, are quite soluble in the glycol solution and partition readily into the desiccant phase along with the water. As will be discussed below, however, this is not a problem as it has been with prior art dehydrators.

The dehydrated gas stream exits the absorber as stream 203, and may be passed to a pipeline, to further treatment or to any other destination.

The amount of water vapor remaining in the dried gas depends on the operating conditions of the absorber, and, importantly, the initial water content of the desiccant. TEG and other popular desiccants are subject to thermal decomposition, which occurs to a greater or lesser extent depending upon the time/temperature history of the desiccant. To avoid decomposition of the desiccant (and hence increased operating costs for makeup desiccant and for cleaning out decomposition products), prior art processes that use a reboiler to regenerate the desiccant are normally operated at temperatures no higher than about 200° C. Under these conditions, the regenerated lean glycol still contains about 2 wt % water. Even under optimum operating conditions, the lowest water dew points that can be achieved in the dehydrated gas stream by use of this type of glycol are typically in the range 0° C. to –10° C.

Such dew points can also be reached without difficulty by the process of the invention. However, as discussed below, the pervaporation regeneration step used in the present process is able to achieve much lower residual water content in the regenerated lean glycol, for example values such as 1 wt %, 0.5 wt %, or 0.2 wt %. Using this much drier glycol as sorbent enables much lower dew points to be obtained in stream 203. Therefore the water dew point of stream 203 is typically 0° C. or below, and may be much lower, such as –20° C., –40° C. or even lower, such as –50° C. or below.

The water-rich or "spent" glycol solution, stream 202, is withdrawn from the bottom of the absorber. If the raw gas contains typical amounts of water and BTEX, for example on the order of 1,000 ppmv water vapor and 200 ppmv BTEX, then the spent glycol typically contains on the order of 5 wt % water and 1 wt % BTEX.

Stream 202 is heated to the desired feed temperature for the pervaporation step. In this regard, similar considerations apply as for a conventional regeneration system reboiler. That is, the stream should not be heated above the temperature at which the glycol will decompose. Thus, depending on the properties, condition, and use history of the glycol, the upper limit for this temperature is usually around 250° C. or lower, such as 220° C. or 200° C. However, depending on other conditions in the pervaporation step, discussed later, lower temperatures, such as 150° C. or even lower, may be appropriate. As a general guideline, a temperature in the range 150–250° C. is most preferred.

In the preferred arrangement of FIG. 2, stream 202 is first warmed by running in heat-exchanging relationship against stream 206 in any convenient type of heat exchanger, 212. Warmed stream 204 is then further heated in heater 213, again of any convenient type, to produce heated stream 205.

Heated stream 205 passes as a feed stream into membrane pervaporation unit 214, containing membranes 218. Few polymeric membrane materials are stable at the most preferred stream temperatures, that is, above 150° C. Therefore, the preferred membranes for natural gas dehydration processes are inorganic membranes, made from amorphous silica or hydrophilic zeolite. The membranes are typically, but not necessarily, in tubular form.

The membranes typically exhibit high separation factors of at least about 100 in favor of water over glycol and in favor of water over benzene and all other BTEX components. Under typical process operating conditions, separation factors much higher than this may be obtained, such as 500, 1,000 or more. The membranes also exhibit transmembrane vapor pressure-normalized water fluxes of, preferably, at least about 10 $g/m^2 \cdot h \cdot psid$, more preferably at least about 15 $g/m^2 \cdot h \cdot psid$, and most preferably at least about 20 $g/m^2 \cdot h \cdot psid$.

As is illustrated in the Examples section below, very little membrane area is required to perform the pervaporation step. As a general guide, for every million scfd of raw gas treated, the pervaporation step will typically require less than 1 $m^2$ of membrane area, and sometimes much less, such as only 0.2 $m^2$. Therefore, even though inorganic membranes tend to be expensive compared with polymeric membranes, system costs are reasonable. High separation factors also mean that a single membrane separation step can generally be used and this configuration is preferred in this case. A multistep or multistage configuration could be used if additional processing capability is needed, but is usually not required.

As discussed above, transport through the membrane is induced by maintaining the vapor pressure on the permeate side of the membrane lower than the vapor pressure of the feed liquid. On the feed side, high partial pressure for water vapor is obtained by heating the feed stream. The permeate side of the membrane may be maintained at atmospheric pressure. In this case, since the permeate is essentially pure water vapor, the water vapor pressure on that side will be about 15 psia.

Depending on the temperature of the feed solution, the driving force for water vapor permeation will thus disappear when the feed side water vapor pressure has dropped to 15 psia. For a feed stream heated to a temperature roughly between about 150° C. and 200° C., for example, this point of zero driving force will be reached when the glycol concentration on the feed side has dropped to roughly between 1 wt % and 4 wt %. If a very low dew point for the dehydrated gas is not required, returning a regenerated glycol stream that still contains a few percent water, as is done in many prior art systems, will suffice. In this case, a water vapor permeate stream will simply be withdrawn from the pervaporation unit at atmospheric pressure.

FIG. 2 assumes that a lower dew point is desired, in which case the water content of the regenerated glycol must be reduced to a lower level, such as below 1 wt %. Therefore, to lower the water vapor pressure on the permeate side, a sweep gas stream 207 is blown across the permeate side of the membrane by blower 217. Air is a convenient and preferred sweep gas, although nitrogen, natural gas, or any other gas that it is acceptable to vent, or for which a subsequent use can be found, may be used. If air is used, it is not necessary to dry the air first, since the partial pressure of water vapor in the air under normal conditions is less than 0.3 psia. Likewise, if natural gas is used, it need not be dry, so a slipstream from wet natural gas stream 201 may be used as the sweep gas. The natural gas sweep stream, laden with water vapor, may then conveniently be used as boiler or heater fuel. Since the flow of permeating water vapor is relatively small, the sweep stream flow rate can be small also, generally, but not necessarily, on the same order as the flow of permeant gas.

The pervaporation step separates the feed stream 205 into a liquid glycol residue stream, 206, and a water vapor permeate stream 208. Owing to the high separation factor of the membranes, the permeate stream usually contains only traces of BTEX, glycol and other organic components, in total usually less than 500 ppmv, and often lower still, such as less than 200 ppmv, 100 ppmv, or even 50 ppmv. This stream may be discharged.

Glycol residue stream 206 typically contains less than 1 wt % water, but is still laden with essentially all of the BTEX content that was in the feed stream 205. When the process is in operation therefore, the BTEX content of the circulating glycol increases until a steady state is reached, where the BTEX content of the glycol stream is in equilibrium with the BTEX present in the natural gas stream. At this point, no additional BTEX is sorbed and the BTEX concentration of the dehydrated gas, stream 203, stabilizes at the same level as in the raw gas, stream 201, typically about 200 ppmv.

Under typical process conditions, this results in an equilibrium BTEX concentration in the circulating glycol of no more than about 1 wt %. The presence of BTEX at this level has no significant effect on the water sorption capability of the glycol.

Stream 206 is passed back to the absorption step by means of pump 215. As was mentioned above, the preferred temperature for the glycol entering the absorption tower is a few degrees above the gas temperature, and is preferably no higher than around 60° C. Therefore, the residue stream should generally be cooled. This is done according to the preferred design of FIG. 2 by running stream 206 in heat-exchanging relationship with spent glycol stream 202 in heat exchanger 212. Resulting cool stream 209 is further cooled, such as by air cooling, in cooler 216 and returned as cooled lean glycol stream 210 to the absorber.

FIG. 2 shows the glycol sorption/regeneration as occurring in a closed loop, that is with all of the spent glycol being regenerated and recirculated. It will be appreciated by those of skill in the art that portions of glycol may be withdrawn from the loop via purge means 219 or added to the loop via fresh liquid desiccant inlet 220 as desired to purge contaminants, top up the system, and so on.

In another aspect, the invention includes the equipment, system or apparatus for carrying out the disclosed dehydration processes. The invention in a most preferred form in this aspect can be understood by reference again to FIG. 2.

The equipment comprises an absorber or absorption unit, 211 and a pervaporation unit, 214. The absorption unit may take any convenient form, but is usually a tank, tower or column equipped with perforated plates or baffles. Other types of absorption unit include membrane contactors, for example.

Absorber 211 is equipped with a wet gas inlet line, 201, a dehydrated gas outlet line, 203, a liquid desiccant inlet line, 210, and a spent desiccant outlet line, 202. Inlet line 201 is normally positioned near the bottom of the column and outlet line 203 is normally positioned near the top of the column. Conversely, inlet line 210 is normally positioned near the top of the column and outlet line 202 is normally positioned near the bottom. Thus, column 211 is adapted for countercurrent flow between gas and liquid, and to provide water-partitioning contact between gas and liquid.

Pervaporation unit, 214, is a membrane separation unit equipped with a feed liquid inlet line, 205, a feed liquid outlet line, 206, and a permeate vapor outlet line, 208. Optionally, but not necessarily, the unit may also be equipped with a permeate sweep gas inlet line, 207.

Unit 214 contains one or more inorganic membranes, 218, adapted to operate at temperatures above 150° C. The inorganic membranes can be in any convenient form, such as tubes, fibers or sheets, and may be supported on a ceramic, metal or other support structure, as well known in the art. The membranes themselves are hydrophilic, and preferably comprise a silica or zeolite layer, as discussed above with respect to the process embodiments.

The membranes are characterized by the ability to provide pervaporation separation factors of at least about 100 in favor of water over triethylene glycol and in favor of water over benzene when used to treat a triethylene glycol stream containing about 5 wt % water and 1 wt % benzene at 200° C.

As shown in FIG. 2, the equipment also includes an optional heat exchanger or heat-exchanging means, 212, through which spent liquid desiccant line 202/204 passes, so that spent liquid desiccant may pass out of the absorber and be warmed by flowing via the heat exchanger into line 204 and thence to line 205 and into the membrane separation unit. The heat exchanger is usually a simple shell-and-tube unit, as well known in the art, but can be any convenient type of exchanger.

Regenerated liquid desiccant line 206/209 also passes through optional heat exchanger 212, so that regenerated liquid desiccant flowing from the pervaporation unit in line 206 can be cooled by flowing via the heat exchanger into line 209 and thence to line 210 and back into the absorber.

The equipment further includes liquid pump 215 in line 206 to pump regenerated desiccant back to the absorption tower. If a sweep gas inlet line, 207, is provided, a pump or blower, 217, may also be provided to generate a flow of sweep gas in line 207, across the permeate side of the membranes and out via line 208.

Optionally, additional heating means, 213, and cooling means, 216, may be provided.

Heater 213 is positioned so that line 204 forms the inlet line to the heater and line 205 forms the outlet line from the heater. The heater itself may be of any type, such as a gas-fired boiler, an electric heater, or a steam heater.

Cooling means, 216, is positioned so that line 209 forms the inlet line to the cooler and line 210 forms the outlet line from the cooler. The cooler itself may be of any type. Usually, a simple air cooler will suffice, but water cooling or any other cooling mechanism may be used if desired.

Optionally, but not necessarily, a purging means, 219, may be added in line 202 (or elsewhere in the loop formed by the absorber, membrane separation unit, and connecting lines, as convenient) to enable removal of a portion of spent liquid desiccant. Purging allows control of the volume of contaminants or decomposed desiccant that may build up in the desiccant recirculation loop. Optionally, but not necessarily, a fresh liquid desiccant inlet means, 220, may be added in line 210 (or elsewhere in the loop formed by the absorber, membrane separation unit, and connecting lines, as convenient) to enable fresh liquid desiccant to be introduced into the apparatus.

The invention is now further described by the following examples, which are intended to be illustrative of the invention, but are not intended to limit the scope or underlying principles in any way.

EXAMPLES

Example 1

An experiment was performed to determine the water flux of a zeolite membrane module (Mitsui USA, N.Y.), containing 70 cm$^2$ of membrane area. The zeolite module was tested at 100° C. with a triethylene glycol mixture containing 5 wt % water. A nitrogen sweep was provided on the permeate side. The flow rate of the feed solution was 0.25 gpm. The results are shown in Table 1.

TABLE 1

| Expt. # | Temperature (° C.) | N$_2$ Sweep (L/min) | Water Flux (g/m$^2$ · h) | Vapor Pressure- Normalized Water Flux (g/m$^2$ · h · psid) |
|---|---|---|---|---|
| 1 | 98 | 5.2 | 60 | 23 |
| 2 | 100 | 5.0 | 130 | 43 |

Example 2

Figure 3:
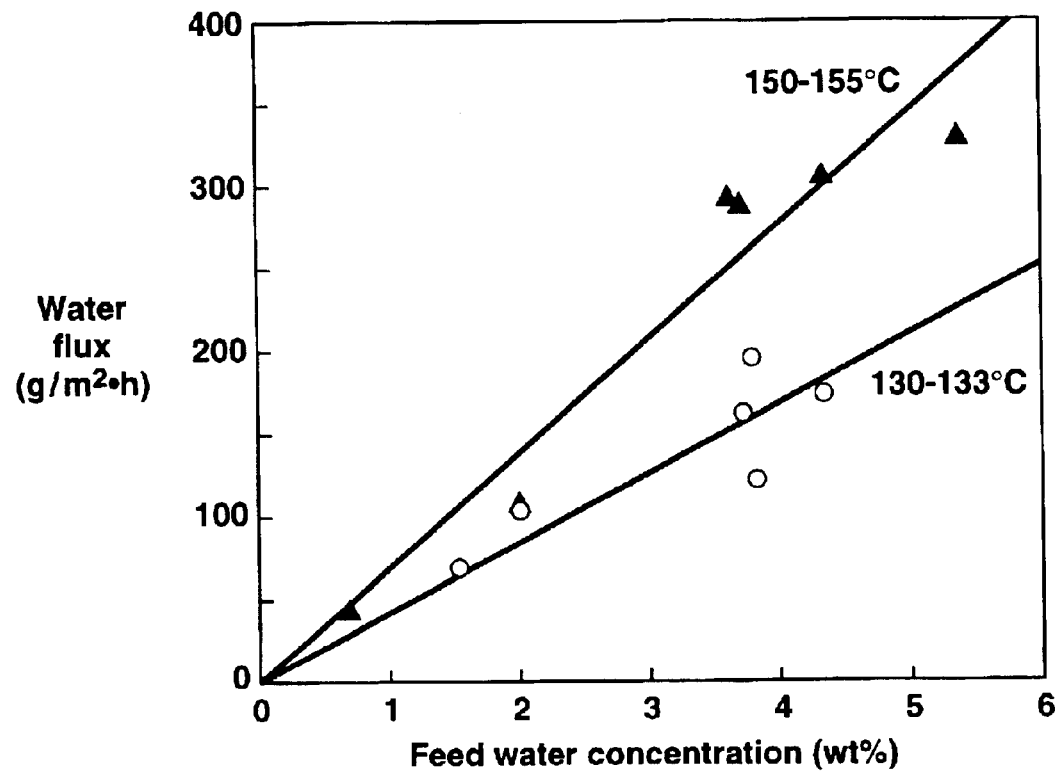
FIG. 3 is a graph of water flux of a silica membrane module as a function of feed water concentration at two temperatures.

Two series of experiments similar to those of Example 1 were carried out with a silica membrane module (Pervatech, Enter, The Netherlands), containing 55 cm$^2$ of membrane area. The silica module was tested with triethylene glycol mixtures containing 0.7–5.5 wt % water. The mixture also contained 0.5 wt % hexane and 0.5 wt % toluene. The first series of experiments was carried out at about 130° C., the second set at about 150° C. The upper temperature was the limit of the test system, determined by the heat transfer capacity available in the system. The feed flow rate was 0.5 gpm. A nitrogen sweep at a flow rate of 2.5 L/min was provided on the permeate side. The results of the experiments are shown in FIG. 3, which plots the water flux of the membrane as a function of the feed water concentration.

Figure 4:
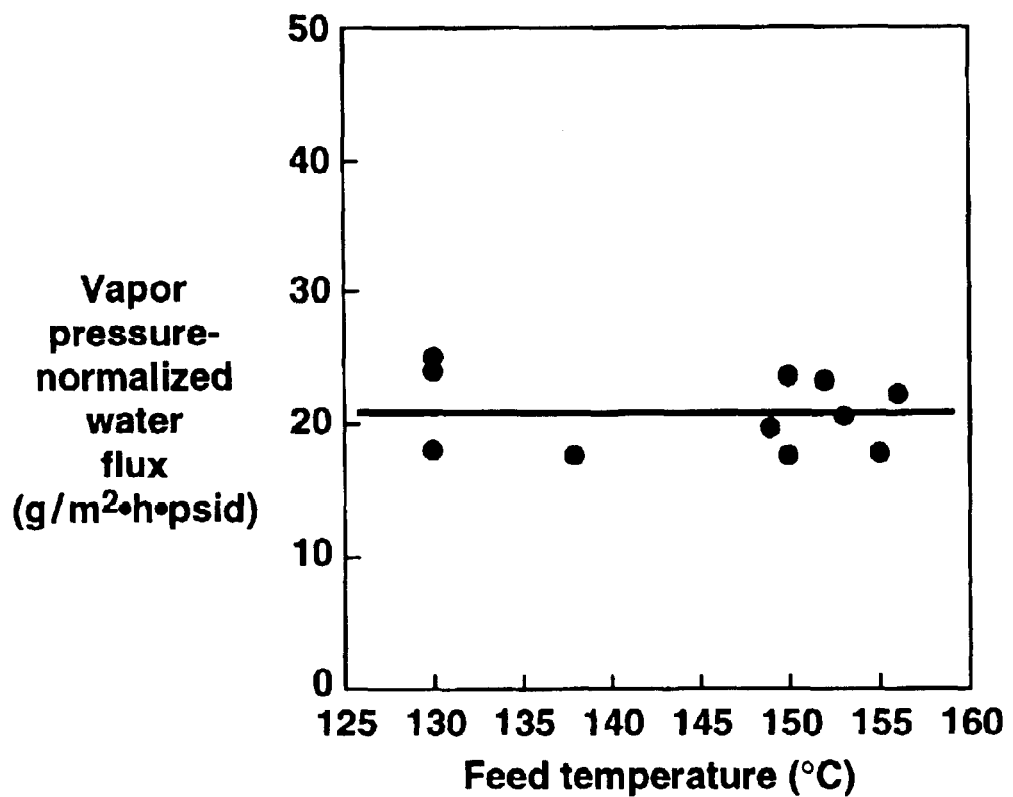
FIG. 4 is a graph of water flux of a silica membrane module as a function of feed temperature.
Figure 5:
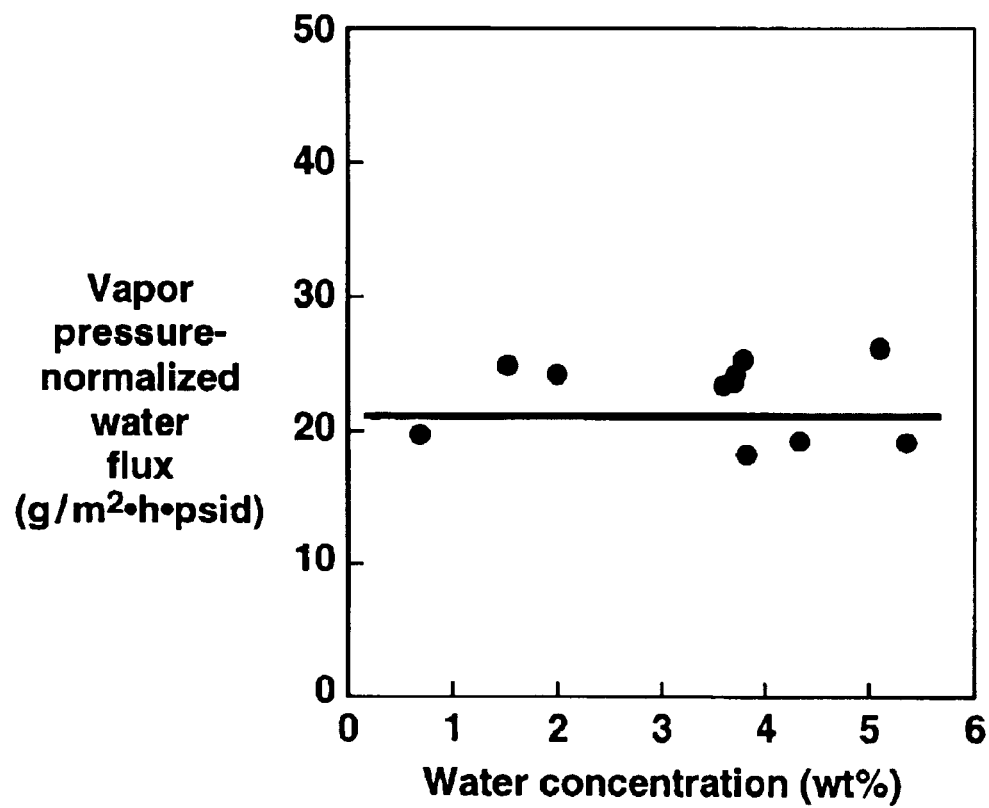
FIG. 5 is a graph of water flux of a silica membrane module as a function of feed water concentration.

In all experiments the permeate was essentially pure water with hexane and toluene present in the low ppm range. FIG. 3 shows that the flux increases with the water concentration in the feed and with the feed temperature. However, the water flux normalized for the water vapor pressure differential across the membrane is essentially constant at 22 g/m$^2$·h·psid, as shown in FIGS. 4 and 5, which plot the vapor pressure-normalized water flux as a function of feed temperature and water concentration, respectively.

Example 3

Permeate samples were collected during the silica membrane pervaporation experiments of Example 2, and were analyzed for their hexane and toluene content by GC. The very low permeation rates of toluene and hexane made accurate measurements with our equipment difficult. However, representative data are shown in Table 2.

TABLE 2

| Component | Feed Concentration (wt %) | Equilibrium Vapor Pressure (psia) | Permeate Concentration | Vapor Pressure- Normalized Flux (g/m$^2$ · h · psid) |
|---|---|---|---|---|
| Water | 5.4 | 21.6 | 99.99+ wt % | 35 |
| Triethylene Glycol | 93.6 | 0.13 | none detected | — |
| Toluene | 0.5 | 1.5 | 18 ppmw | 0.009 |
| Hexane | 0.5 | 8.7 | 22 ppmw | 0.002 |

The highest toluene concentration measured was 50 ppmw (ppm by weight) and the highest hexane concentration was 30 ppmw; many samples contained significantly less. Based on the highest concentrations measured at 157° C., the toluene pressure-normalized flux is on the order of 10$^{-2}$ g/m$^2$·h·psid, and the n-hexane flux is on the order of 10$^{-3}$ g/m$^2$·h·psid. These fluxes are orders of magnitude lower than the water flux of 22 g/m$^2$·h·psid, indicating that the silica membrane will significantly reduce emissions of BTEX from glycol dehydrators.

Example 4

A set of permeation experiments was performed in the same manner as those of Example 2 using a zeolite membrane (Mitsui USA, N.Y.), and a feed mixture of 1 wt % toluene, 1 wt % hexane, and 15 wt % water in isopropanol. This mixture generates much higher permeation rates than the glycol mixtures used for the previous experiments, facilitating more accurate measurement and analysis of the permeate stream. The experiments were carried out at 80° C., and a nitrogen sweep at a flow rate of 5 L/min was provided on the permeate side. Table 3 shows a representative set of data. The zeolite membrane is very impermeable to both aromatic compounds and straight-chain aliphatic hydrocarbons.

TABLE 3

| Component | Feed Concentration (wt %) | Equilibrium Vapor Pressure (psia) | Permeate Concentration | Vapor Pressure-Normalized Flux (g/m² · h · psid) |
|---|---|---|---|---|
| Water | 15 | 2.47 | 99.95 wt % | 69 |
| Isopropanol | 83 | 4.40 | 530 ppmw | 0.02 |
| Toluene | 1 | 0.15 | 1.7 ppmw | 0.002 |
| Hexane | 1 | 0.70 | 2.5 ppmw | 0.0006 |

As in Example 3, the vapor pressure-normalized fluxes of all of the organic components are orders of magnitude lower than the vapor pressure-normalized flux of water.

Example 5–8

An analysis of the process was carried out based on the experimental data. The analysis was performed using a process simulator, ChemCad V (ChemStations, Inc., Houston, Tex.), to which an in-house modeling program for pervaporation has been added. The analysis was carried out in three steps: (i) calculation of water dew points achieved in the absorption step, (ii) calculation of feed water vapor pressure, and (iii) calculation of membrane area needed to achieve a desired reduction in water dew point of the treated gas.

Example 5

Data from the Gas Conditioning Fact Book (Dow Chemical Co., 1962) were used to calculate the water dew point that can be achieved in the absorption step as a function of the initial water content of the lean glycol (TEG). It was assumed that the raw gas was water-saturated. The calculations were performed at 27° C. and 38° C., two temperatures that are typical of natural gas streams at the wellhead and in gas processing plants. The pressure of the natural gas does not significantly affect the relationship between dew point and glycol water concentration.

Figure 6:
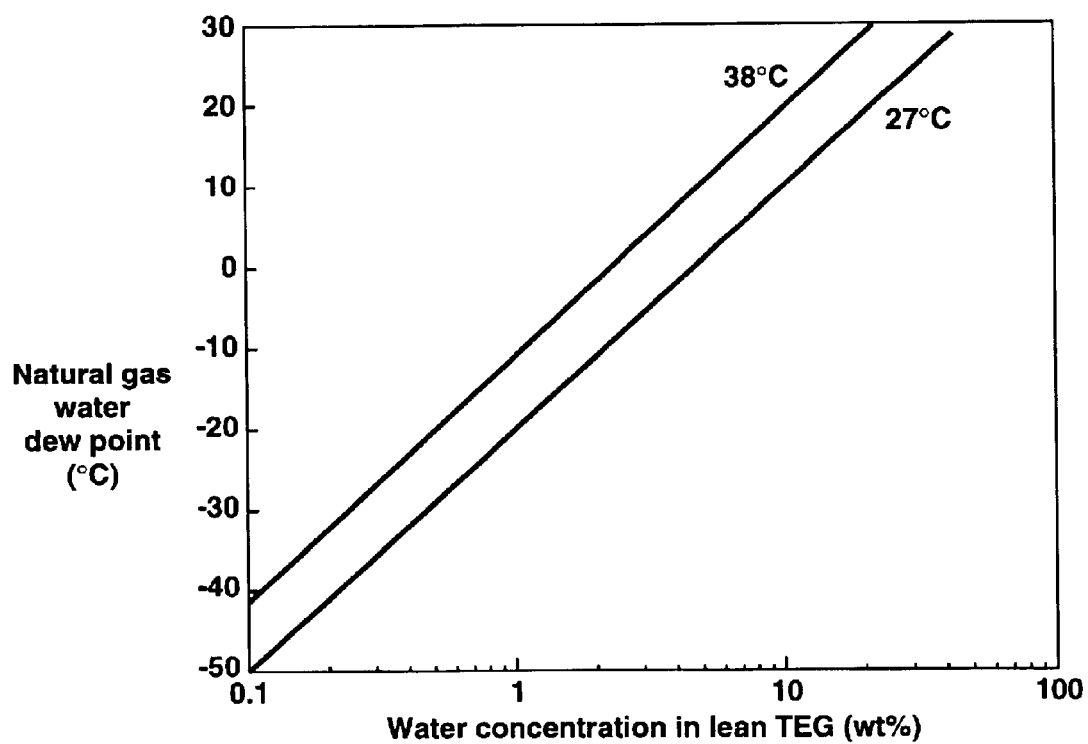
FIG. 6 shows the relationship of water dew point of dehydrated natural gas as a function of initial feed water concentration in the dehydrating glycol at two temperatures.

The relationships between initial glycol water content and dried gas dew point at the two temperatures are shown in FIG. 6. As expected, achieving lower dew points requires lower water concentrations in the lean glycol stream, and the water concentration in the glycol must be lower at higher natural gas/glycol contactor temperatures.

Example 6

Figure 7:
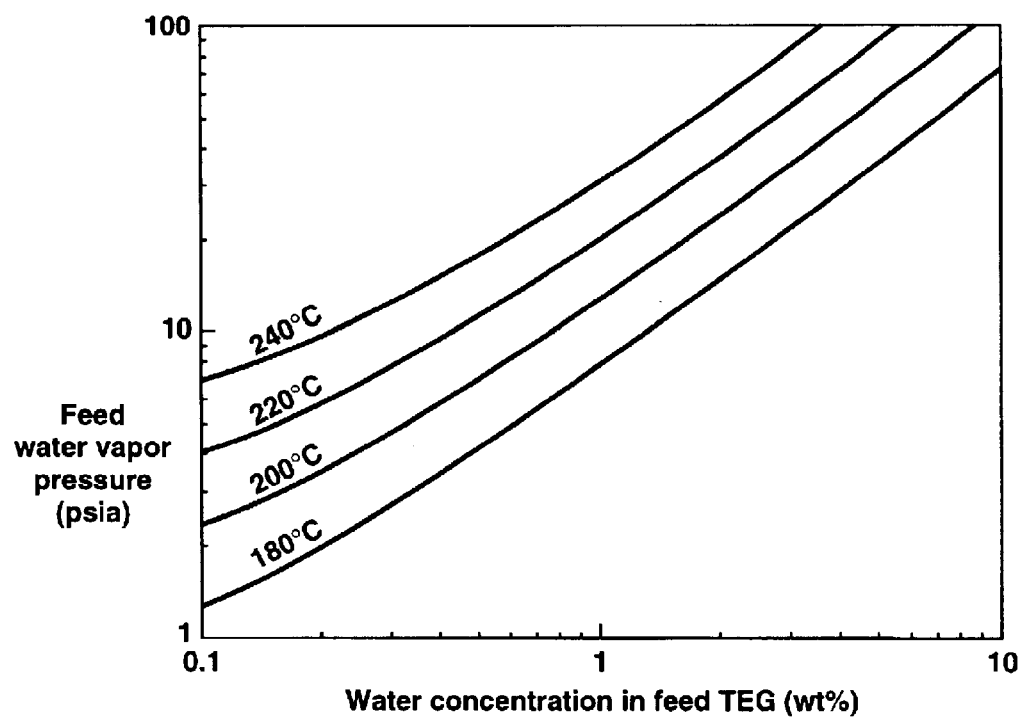
FIG. 7 shows the equilibrium water vapor pressure associated with mixtures of water in triethylene glycol (TEG) at different temperatures.

The Peng-Robinson equation of state was used to estimate the equilibrium water vapor pressure associated with mixtures of water in triethylene glycol (TEG) at different temperatures. The calculations were used to generate a series of curves, as shown in FIG. 7. The curves clearly show that the higher the temperature at which the membrane separation step is performed, the higher is the water vapor pressure on the feed side, hence the better is the driving force for transmembrane permeation of water.

Example 7

Figure 8:
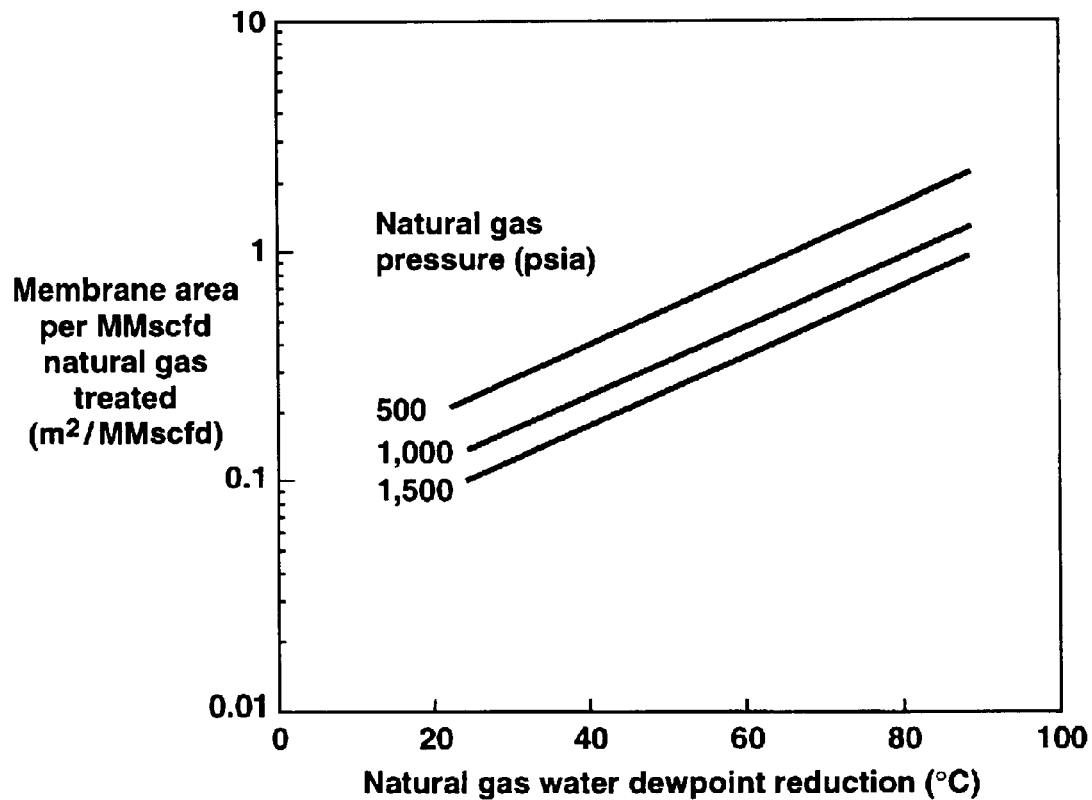
FIG. 8 is a graph of the membrane area required per MMscfd of natural gas treated as a function of the water dew point reduction at three natural gas pressures.

The pervaporation modeling program was used to calculate the membrane area required to achieve water dew point reductions of 20° C., 40° C., and so on. The calculations assumed that the raw gas to be treated in the absorption step was saturated with water vapor at 38° C., and incorporated the calculations and results of Examples 5 and 6. The membrane was assumed to provide a vapor pressure-normalized water flux of 22 g/m²·h·psid. The absorption step was assumed to be carried out at 38° C. and the pervaporation step at 220° C. The calculations were repeated for three raw gas pressures: 500 psia, 1,000 psia, and 1,500 psia. The results of the calculations are shown in FIG. 8.

As can be seen, the higher the natural gas pressure, the lesser is the membrane area required to dehydrate the gas to the same extent. The membrane area required for the process is very small, less than about 1 m² per million cubic feed of gas treated, even when an 80° C. reduction in dew point is required.

Example 8

Figure 9:
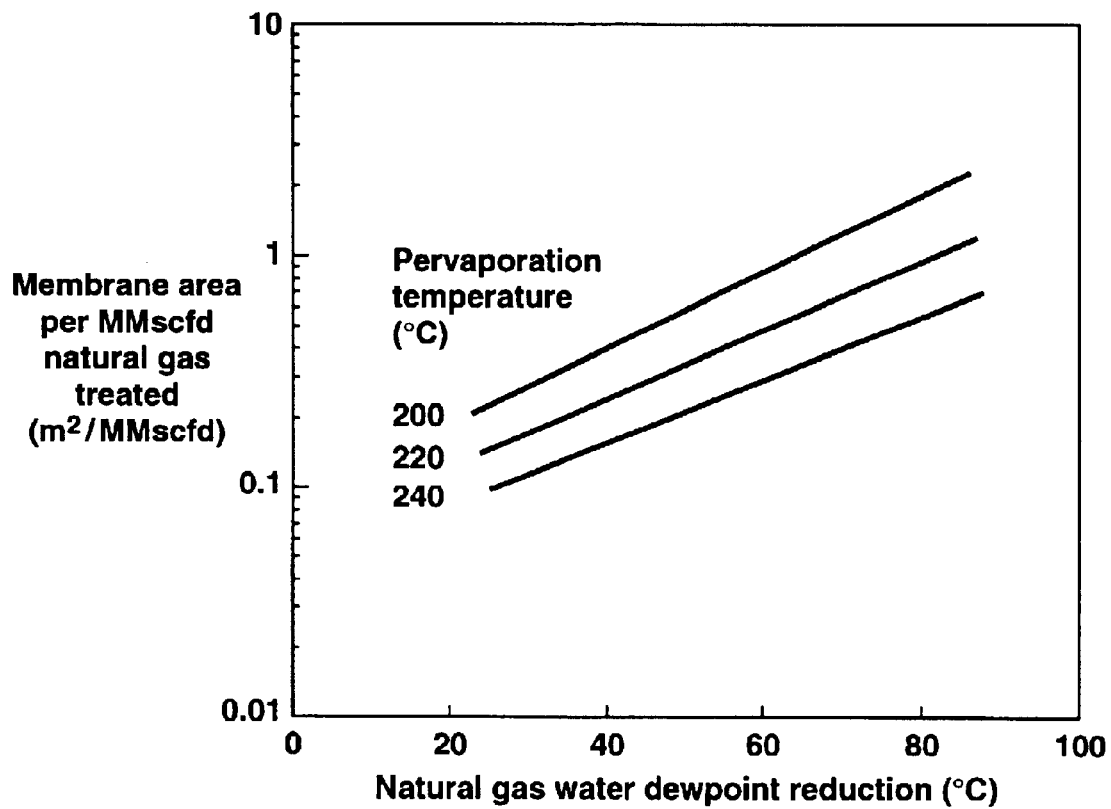
FIG. 9 is a graph of the membrane area required per MMscfd of natural gas treated as a function of the water dew point reduction at three glycol regeneration temperatures.

A set of calculations was performed as described in Example 7, except that the raw gas pressure was now fixed at 1,000 psia, and the calculations were repeated for three different temperatures for the pervaporation regeneration step: 200° C., 220° C., and 240° C. The results of the calculations are shown in FIG. 9.

As can be seen, the membrane area required for any chosen dehydration result decreases as the temperature at which the pervaporation regeneration step is performed increases, because higher temperatures result in higher transmembrane fluxes. Use of lower temperatures would require slightly more membrane area.

We claim:

1. A process for dehydrating natural gas, comprising:
   (a) subjecting a natural gas stream to an absorption step, comprising the steps of:
      (i) contacting the natural gas stream with glycol in an absorber;
      (ii) withdrawing from the absorber a dehydrated natural gas stream;
      (iii) withdrawing from the absorber a water-laden glycol stream; and
   (b) subjecting the water-laden glycol stream to a regeneration step, comprising:
      (i) providing a membrane unit containing a membrane having a feed side and a permeate side and exhibiting a first pervaporation separation factor in favor of water over glycol and a second pervaporation separation factor in favor of water over benzene;
      (ii) heating the water-laden glycol stream;
      (iii) passing the heated water-laden glycol stream into the membrane unit and across the feed side under pervaporation conditions;
      (iv) withdrawing from the feed side a regenerated glycol stream;
      (v) withdrawing from the permeate side a permeate stream comprising water vapor;
      (vi) recirculating at least a portion of the regenerated glycol stream to the absorption step.

2. The process of claim 1, wherein the glycol is selected from the group consisting of monoethylene glycol, diethylene glycol, triethylene glycol, and tetraethylene glycol.

3. The process of claim 1, wherein the glycol comprises triethylene glycol.

4. The process of claim 1, wherein the water-laden glycol is heated to a temperature in the range 150–250° C. in step (b)(ii).

5. The process of claim 1, wherein the regenerated glycol stream contains less than about 1 wt % water.

6. The process of claim 1, wherein the regenerated glycol stream contains less than about 0.5 wt % water.

7. The process of claim 1, wherein the regenerated glycol stream contains less than about 0.2 wt % water.

8. The process of claim 1, wherein the membrane comprises an inorganic membrane.

9. The process of claim 1, wherein the membrane comprises a silica membrane.

10. The process of claim 1, wherein the membrane comprises a zeolite membrane.

11. The process of claim 1, wherein the first pervaporation separation factor is at least 100.

12. The process of claim 1, wherein the second pervaporation separation factor is at least 100.

13. The process of claim 1, further comprising passing a sweep gas across the permeate side.

14. The process of claim 13, wherein the sweep gas comprises air.

15. The process of claim 13, wherein the sweep gas comprises natural gas.

16. The process of claim 1, wherein the membrane, when in use in the process, exhibits a vapor pressure-normalized water flux of at least about 10 $g/m^2 \cdot h \cdot psid$.

17. The process of claim 1, wherein the permeate stream has a total organic compound concentration of less than about 500 ppmv.

18. The process of claim 1, wherein the permeate stream has a total organic compound concentration of less than about 200 ppmv.

19. The process of claim 1, wherein the permeate stream has a total organic compound concentration of less than about 100 ppmv.

20. The process of claim 1, wherein the dehydrated natural gas stream has a water vapor dew point of less than about −10° C.

21. The process of claim 1, wherein the dehydrated natural gas stream has a water vapor dew point of less than about −20° C.

22. The process of claim 1, wherein the dehydrated natural gas stream has a water vapor dew point of less than about −40° C.

23. The process of claim 1, wherein the natural gas stream has a first water vapor dew point and the dehydrated natural gas stream has a second water vapor dew point and the second water vapor dew point is at least 50° C. lower than the first water vapor dew point.

24. The process of claim 1, wherein the natural gas stream has a first water vapor dew point and the dehydrated natural gas stream has a second water vapor dew point and the second water vapor dew point is at least 70° C. lower than the first water vapor dew point.

25. The process of claim 1, wherein the permeate stream is discharged to the atmosphere.

26. A process for dehydrating a gas stream, comprising:
(a) subjecting the gas stream to an absorption step, comprising the steps of:
   (i) contacting the gas stream with a liquid desiccant in an absorber;
   (ii) withdrawing from the absorber a dehydrated gas stream;
   (iii) withdrawing from the absorber a spent desiccant stream comprising desiccant and water;
(b) subjecting the spent desiccant to a regeneration step, comprising:
   (i) providing a membrane unit containing an inorganic membrane having a feed side and a permeate side and exhibiting a pervaporation separation factor in favor of water over the desiccant;
   (ii) passing the spent desiccant into the membrane unit and across the feed side under pervaporation conditions;
   (iii) providing a driving force for transmembrane permeation;
   (iv) withdrawing from the feed side a residue desiccant stream depleted in water compared with the spent desiccant stream;
   (v) withdrawing from the permeate side a permeate stream comprising water vapor.

27. The process of claim 26, wherein the desiccant comprises glycol.

28. The process of claim 26, further comprising heating the spent desiccant before step (b)(ii).

29. The process of claim 26, wherein the residue desiccant stream contains less than about 1 wt % water.

30. The process of claim 26, further comprising recirculating at least a portion of the residue desiccant stream to step (a)(i).

31. The process of claim 26, wherein the inorganic membrane comprises a silica membrane.

32. The process of claim 26, wherein the inorganic membrane comprises a zeolite membrane.

33. The process of claim 26, further comprising passing a sweep gas across the permeate side.

34. The process of claim 26, wherein the inorganic membrane, when in use in the process, exhibits a vapor pressure-normalized water flux of at least about 10 $g/m^2 \cdot h \cdot psid$.

35. The process of claim 26, wherein the gas stream has a first water vapor dew point and the dehydrated gas stream has a second water vapor dew point and the second water vapor dew point is at least 50° C. lower than the first water vapor dew point.

36. The process of claim 26, wherein the gas stream further comprises a volatile organic component, and wherein the inorganic membrane exhibits a pervaporation separation factor of at least about 100 in favor of water over the volatile organic component.

37. The process of claim 26, wherein the permeate stream contains less than about 200 ppmv of organic components.

38. The process of claim 26, wherein the permeate stream is discharged to the atmosphere.

* * * * *